United States Patent [19]

Brody

[11] Patent Number: 4,982,272

[45] Date of Patent: Jan. 1, 1991

[54] MODULAR FLAT-SCREEN COLOR TELEVISION DISPLAYS AND MODULES AND CIRCUIT DRIVES THEREFOR

[75] Inventor: Thomas P. Brody, Pittsburgh, Pa.

[73] Assignee: Magnascreen Corporation, Pittsburgh, Pa.

[21] Appl. No.: 484,576

[22] Filed: Feb. 23, 1990

Related U.S. Application Data

[62] Division of Ser. No. 222,523, Jul. 21, 1988.

[51] Int. Cl.$^5$ .................. H04N 9/30; H05B 37/00
[52] U.S. Cl. .................................. 358/59; 358/241; 340/718; 340/754; 340/760; 340/781
[58] Field of Search .................. 358/59, 56, 241, 230; 340/718, 719, 754, 760, 781, 784, 783; 315/169.3

[56] References Cited

U.S. PATENT DOCUMENTS

| | | | |
|---|---|---|---|
| 3,821,588 | 6/1974 | Przybylek | 313/220 |
| 3,840,695 | 10/1974 | Fischer | 358/61 |
| 3,861,783 | 1/1975 | Dill et al. | 350/160 LC |
| 3,897,997 | 8/1975 | Kalt | 350/161 |
| 3,989,357 | 11/1976 | Kalt | 350/161 |
| 4,006,383 | 2/1977 | Luo et al. | 315/169 TV |
| 4,042,854 | 8/1977 | Luo et al. | 315/169 TV |
| 4,105,294 | 8/1978 | Peck | 350/269 |
| 4,114,070 | 9/1978 | Asars | 315/169 TV |
| 4,135,959 | 1/1979 | Luo et al. | 156/230 |
| 4,156,833 | 5/1979 | Wey et al. | 340/719 |
| 4,266,339 | 5/1981 | Kalt | 29/829 |
| 4,336,536 | 6/1982 | Kalt et al. | 340/783 |
| 4,408,836 | 10/1983 | Kikuno | 350/33 A |
| 4,435,047 | 3/1984 | Fergason | 350/334 |
| 4,688,900 | 8/1987 | Doane et al. | 350/347 V |
| 4,716,403 | 12/1987 | Morozumi | 340/703 |

FOREIGN PATENT DOCUMENTS

PCT/US87/-
01761 1/1988 PCT Int'l Appl.

OTHER PUBLICATIONS

Article Entitled "A New High-Resolution Jumbotron", by Nakagawa et al., published in SID 86 Digest at pp. 246-249.
Article Entitled "A Large Screen Color Display Using an Array of LCD Modules", by Myodo et al., published in Japan Display '83 at pp. 430-432.
Article Entitled "A 6×6 Inch 20 Lines-per-Inch Liquid Crystal Display Panel", by Brody et al., published in IEE Transactions on Electron Devices, vol. 20, No. 11, (Nov. 1973), at pp. 995-1001.
Article Entitled "Alphanumeric and Video Performance of a 6"×6" 30 Liner Per Inch Thin Film Transistor-Liquid Crystal Display Panel", by Luo et al., published in the Proceedings of the S.I.D., vol. 19, No. 2, (1978), at pp. 63-67.

Primary Examiner—Tommy P. Chin
Attorney, Agent, or Firm—Reed Smith Shaw & McClay

[57] ABSTRACT

A modular flat-screen color television display having a large area image can be made using an array of modules of easily manufacturable size and preferably removable. The image on each module extends to the edge of the module so that when placed in the array there is no substantial interruption in the television image since the distance between modules is the same as the distance between picture elements within the modules. Control and drive circuitry enable each module to be driven at the same time, thereby decreasing the time it takes to refresh the entire display. The modules contain picture elements which may be emissive, reflective or transmissive.

16 Claims, 11 Drawing Sheets

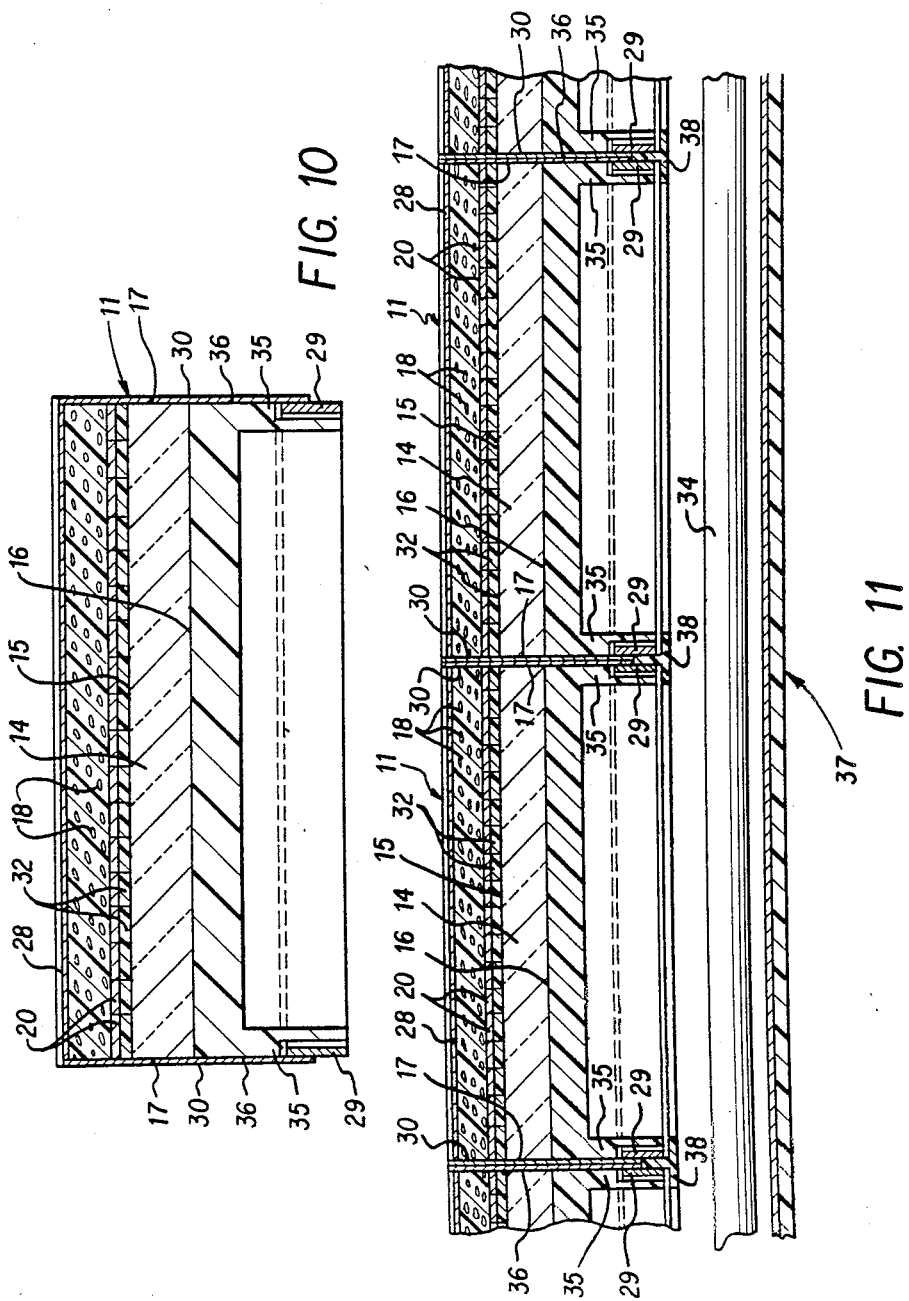

MODULAR FLAT-SCREEN COLOR TELEVISION DISPLAYS AND MODULES AND CIRCUIT DRIVES THEREFOR

RELATED APPLICATIONS

This application is a divisional application of pending application Ser. No. 07/222,523, filed July 21, 1988, and is filed pursuant to a requirement for restriction which has been made final.

FIELD OF THE INVENTION

The present invention relates to a flat-screen television display and more particularly to a flat-screen television display made of modules where the image is uninterrupted by the boundaries between modules.

BACKGROUND OF THE INVENTION

The concept of a large area flat-screen television display which could be hung on a wall like a picture has been contemplated since the commercial introduction of the cathode ray tube television display in the 1940's. Despite pronouncements throughout the 1950's and 1960's that flat-screen television display would shortly become a commercial reality, that did not come to pass. The technical problems encountered in the development caused the cathode ray tube to remain essentially the exclusive way of reproducing video images.

The development of the liquid crystal active matrix flat-screen television display at Westinghouse Electric Corporation during the 1970's brought new life and substance to flat-screen television. See U.S. Pat. No. 3,840,695. This flat-screen display used nematic liquid crystal as an electro-optic medium which would transmit light, or not transmit light, depending on the electric potential applied across it. This display consisted of a glass substrate on which an orthogonal array (or "matrix") of thin film transistors, corresponding to picture elements (or "pixels") in the display, was deposited together with transparent contact pads spaced in a regular pattern, e.g., 1 millimeter on center, for contacting one surface of the liquid crystal layer. Conductive strips, in rows and columns, were also deposited between the picture elements over the substrate, the row strips being connected to the gate electrodes of the transistors and the column strips connected to the source electrodes of the transistors. The drain electrodes of the transistors are connected to the contact pads. A second common transparent contact was placed over the opposite side of the liquid crystal layer to allow a potential to be applied across it completing the picture elements of the matrix.

Each picture element of the display could be individually programmed, for each frame of a television picture, to the appropriate brightness, by storing a line of a frame in a peripheral horizontal analog shift register disposed at the top of the columns of the display. An entire row of switching transistors could then be activated by means of a vertically disposed digital shift register controlling the rows, which then resulted in the transfer of the analog voltage levels stored in the analog shift register at the top of the columns into the storage capacitors of that row. By repeating this sequence for each row of the matrix sequentially, in synchronism with the incoming video signal, the entire frame was constructed. In actual practice, the storage capacitor for each picture element could consist of the liquid crystal layer itself, thus simplifying the driving circuit to a single switching transistor at each picture element. With an analog shift register, an entire television frame could be generated by the timing and control circuit in real time, e.g., 33 msec. Also, the normally sluggish liquid crystal medium was able to show moving grey scale images of considerable perfection using this configuration. A color display was also produced by placing a patterned red-green-blue filter adjacent the active matrix so that each picture element could also be coordinated with the color components of a color video signal.

These active matrix liquid crystal flat-screen displays have been and are being made commercially for pocket size televisions. However, their size has been limited by the acceptable yield achievable with present manufacturing techniques. Typical active matrix liquid crystal displays have been 2 to 3 inches diagonal, although in development laboratories they have been made up to 10 inches diagonal. The latter, however, have not been made to my knowledge with acceptable yield. Moreover, even when such displays were successfully built, an added problem was the prospect of localized defects occurring in the display which could not be remedied without rejection or replacement of the entire display. Also, such liquid crystal displays needed a retaining wall to confine the liquid crystal in the image forming central area, and outside of this wall, substantial terminals were needed for each column and row of the matrix for interconnection with column and row driver circuits. For this reason, modular constructions of such displays were impractical, since the image area of each module was bounded by a wide opaque margin. It has been proposed to modularize the construction by limiting the column and row terminals to two or three sides, see U.S. Pat. No. 4,156,833; however, this limited the number of modules for a display typically to two or at most four, and in turn limited the size of the display.

Modular constructions of very large cathodoluminescent and liquid crystal displays have been made for stadiums and the like. These displays, up to 25×40 meters in size, have been made with a large number of modules; however, they are characterized by very coarse resolution resulting from very large picture elements, e.g., one inch square. The boundaries of the modules in these large panels, particularly those constructed of liquid crystal modules, are visible in the resulting overall image, and produce a very undesirable effect.

Electroluminescent phosphors have also been contemplated for use in flat-screen television displays. This alternative, however, involves more sophisticated electronics. Electroluminescent phosphor displays operate at much higher voltages than liquid crystal displays, and in such an active matrix, two transistors and a capacitor are needed at each picture element to perform the switching function performed by one transistor in a liquid crystal display. See U.S. Pat. Nos. 4,006,383, 4,042,854 and 4,135,959.

SUMMARY OF THE INVENTION

The present invention is a modular flat-screen television display capable of a large area image comprised of an array of modules of readily manufacturable size. The modules are of such size to provide good manufacturing yields and small enough to be rejectable or replaceable at relatively low cost, with the most economical size for manufacture becoming larger as manufacturing techniques improve. The image on each module extends to the edge of the module so that when placed in the array with similar modules, vertically and horizontally, there is no substantial interruption in the television image produced by the array. The modules are typically rectangular in shape and are alike, although different shaped and sized modules may be used as desired so long as they mate to form the desired array. The size of the modules is a trade-off against the complexity of the control and drive circuits; the smaller the modules the higher the manufacturing yield and the more complex the control and drive circuits for a display of a given size.

The flat-screen television display is comprised of a plurality of modules positioned adjacent each other to form an array the size of the desired flat-screen. Each module has a substrate with first and second major surfaces and edge surfaces A matrix of picture elements or conductive pads defining picture elements extends over the first major surface of the substrate spaced in a regular pattern, with boundary picture elements or conductive pads adjacent the edge surfaces of the substrate to distances such that the regular pattern is continued substantially uninterrupted between adjacent modules.

In each module, a matrix of electrical switching elements extends over the first major surface of the substrate with each switching element capable of activating a picture element or conductive pad upon receiving electrical signals through both row and column conductive strips. The row and column conductive strips each extend over the first major surface from adjacent an edge surface to adjacent an opposite edge surface of the substrate such that each switching element can be electrically activated by a row conductive strip and a column conductive strip. Preferably, at least one set of row and one set of column conductive strips are provided adjacent picture elements side-by-side while retaining the corresponding distance between picture elements of the matrix. An electrical drive circuit is also positioned adjacent the second major surface of the substrate and capable of electrically activating the switching elements in correspondence to desired video images to be reproduced by the picture elements over the first major surface of the substrate. Finally, each module has interconnecting conductors, preferably adjacent the edge surface of the substrate, electrically connecting the drive circuit adjacent the second major surface with the row and column conductive strips along the first major surface, and is electrically insulated from like interconnecting conductive strips on adjacent modules.

The picture elements of the modules may be emissive, reflective or transmissive. Where emissive picture elements are employed, suitable electroluminescent phosphor powders are: for blue color, ZnS,Cu:Br or ZnS,Cu:I; for green color, EnS,Cu:Br with more Cu:Br than for blue; for yellow color, $Zn_{.9}Cd_{.1}S,Cu:Br$ or $Zn_{.9}Mn_{.1}S,Cu:Br$ or $Zn_{.7}Cd_{.3}S,Cu:Br$; and for red color, ZnSe,Cu:Br, $ZnSe_{.9}S_{.1},Cu'Br$ or $Zn_{.7}Cd_{.3}S,Cu'Br$, together with a red dye overlay filter. The phosphor powder is dispersed in a binder with a high dielectric constant. Alternatively, electroluminescent films consisting, for example, of EnS:Sm for red color, ZnS:Tb for green color and SrS:Ce for blue color could be used for emissive picture elements. Alternatively for reflective picture elements, electrostatic display devices with variable flexibility can be used such as those described in U.S. Pat. Nos. 3,897,997, 3,989,357, 4,105,294, 4,266,339, 4,336,536, and 4,168,663.

Alternatively, and preferably, however, the picture elements are either reflective or transmissive elements comprised of a light modulating film composed of a liquid crystal dispersion in a polymeric binder. Suitable films are described in U.S. Pat. Nos. 4,435,047 and 4,688,900. If reflective, each module has a mirror surface on the first major surface of the substrate over which the picture elements, switching elements and conductive strips are positioned, preferably with an opaque mask layer in the areas of conductive strips and switching elements to improve the contrast of the reproduced video picture If transmissive, a light source for one or more modules is positioned adjacent the second major surface of the substrate, and a frame is formed as an extension of the edge surfaces of the substrate and capable of transmitting the light through the substrate. The light source may in some transmission embodiments, as desired, be common to all modules in the array, and the drive circuit for each module is more specifically positioned adjacent the frame. Alternatively, separate light sources are provided for each module surrounded by the frame and each module has a backer board positioned adjacent the light source opposite the second major surface of the substrate to enclose the light source.

In still other alternative embodiments, the light modulating film is not part of the module but rather separately provided as part of the flat screen display. In these embodiments, the light modulating film is positioned adjacent a first major surface forced by the array of modules, and a transparent electrode is positioned in contact with a first major surface of the light modulating film opposite from the first major surface of the array of modules. The modules have conductive pads that define the picture elements and contact a second major surface of the light modulating film opposite from the first major surface to form the picture elements in the light modulating film.

In addition, whether such picture elements are transmissive or reflective, to be able to reproduce color television pictures, a color filter is preferably positioned adjacent the picture elements of the matrix so that only one color will be displayed by each picture element, typically red, green or blue for a standard color television signal The number of picture elements in such a color display of given size is typically increased by three-fold over a similar black and white display to provide similar picture quality. There is not necessarily, however, for a one-to-one correspondence between red, green and blue picture elements, and where there is such correspondence, the colors are not necessarily in alternate rows or columns of the module.

The flat-screen television is also comprised of an electrical control circuit capable of categorizing incoming television picture signals corresponding to the modules in the array and directing the electrical signals to the drive circuits of each module according to the portion of the television picture to be reproduced by the picture elements of that module. Preferably, the electrical control circuit comprises a decoder circuit and an image processor. The decoder circuit operates on the input video signal and separates it into at least two parts, one containing the video data or information and the other containing the video synchronizing signals. If the input video signal is of a color image, the decoder preferably separates it into a video signal for each color, typically a red video signal, a green video signal and a blue video signal. Decoder circuits are well known in the television field and any number of them can be used. For the purpose of the present invention, the decoder circuit transforms the input video signal into the appropriate video signals needed by the image processor.

The image processor, as its name implies, is the electronic circuitry which processes the video signals to direct the appropriate signals to the electrical drive circuits of the appropriate modules at the appropriate times. The image processor uses a timing and control circuit to accomplish this. The timing and control circuit generates a clock signal and control signals for each module from the synchronizing signal. The image processor also contains a circuit for storing the video signals from the decoder circuit Preferably each color video signal is stored digitally in a separate memory capable of holding an entire frame of data. The data is then read out of each memory and fed to the electrical drive circuit of the appropriate module, as described above, in response to signals from the timing and control circuit. Preferably this is done in parallel rather than in series so that all modules are activated at the same time instead of sequentially. It is possible, however, to read out the stored data in series. The timing and control circuit can be implemented by dedicated hardware or, in whole or in part, by a microprocessor or other computer.

The timing and control circuit determines which and when electrical drive circuits are activated, thereby activating the switching elements in the different modules. Preferably, the electrical drive circuits contain analog and digital switches which control the row and column conductor strips. Both the row and the column conductor strips connected to a switching element must be simultaneously activated in order to activate that switching element at the intersection of a row and column in the matrix. The number of digital and analog switches used in the electrical drive circuit and their specific arrangement depend upon whether the switching elements of the same color are arranged in horizontal rows or vertical columns or some other pattern, as well as whether row-at-a-time or column-at-a-time switching is used.

In another embodiment, the video signal is not stored in digital form but is fed serially to an analog shift register associated with each module which stores the data in an analog form. The video signal is then fed, in parallel, to each module depending upon the control signals from a timing and control circuit. This simplifies the number and complexity of the circuits required in the electrical control circuit.

"Television" and "video" are used herein in a broad sense to refer to the reproduction of visual images using electronic signals. Television and video includes the reproduction of commercial broadcasting signals as well as the reproduction of visual images using electronic signals generated from a variety of sources including, but not limited to, video tapes, video disks, microprocessors and other computers.

Other details, objects and advantages of the invention will become apparent as the following description of the presently preferred embodiments and presently preferred methods of practicing the invention proceeds.

BRIEF DESCRIPTION OF THE DRAWINGS

In the accompanying drawings, the preferred embodiments of the invention and preferred methods of practicing the invention are illustrated:

FIG. 10 is a cross-sectional view of another alternative embodiment of the module shown in FIG. 2;

FIG. 11 is a fragmentary cross-sectional view of a modular flat-screen television display of the present invention utilizing the module shown in FIG. 10;

DESCRIPTION OF THE PREFERRED EMBODIMENTS

Construction Of The Flat-Screen Television Display.

Figure 1:
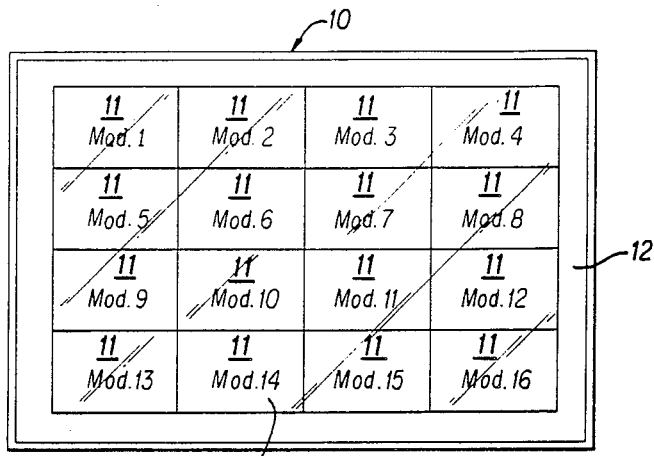
FIG. 1 is an elevational view of the modular flat-screen television display of the present invention containing 16 modules in a four-by-four array.

Referring to FIG. 1, a flat-screen television display 10, preferably with color capability, is shown containing sixteen similar modules 11 surrounded by decorative frame 12. Modules 11, which are preferably square or rectangular for convenient mating, are positioned adjacent to each other to form a 4×4 array the size of the desired flat-screen display 10. The overall size of display 10 will depend on the particular application; for convenience for commercial television applications, with a 3:4 aspect ratio, a rectangular display is preferred, and for computer applications, with a 1:1 aspect ratio, a square display is preferred. It is contemplated that modules 11 are preferably about 6×6 inches or 6×8 inches, which can be made with satisfactory manufacturing yields, resulting in the 4×4 flat-screen display being 33.9 inches or 40 inches diagonal, respectively. Positioned in front of modules 11 in frame 12 is a glass 13 (shown in FIG. 14), possibly of the type to slightly diffuse the picture-element images to provide a better quality television image. The remainder of the support structure for the flat-screen television display 10 is described later by reference to FIGS. 13 and 14.

Figure 2:
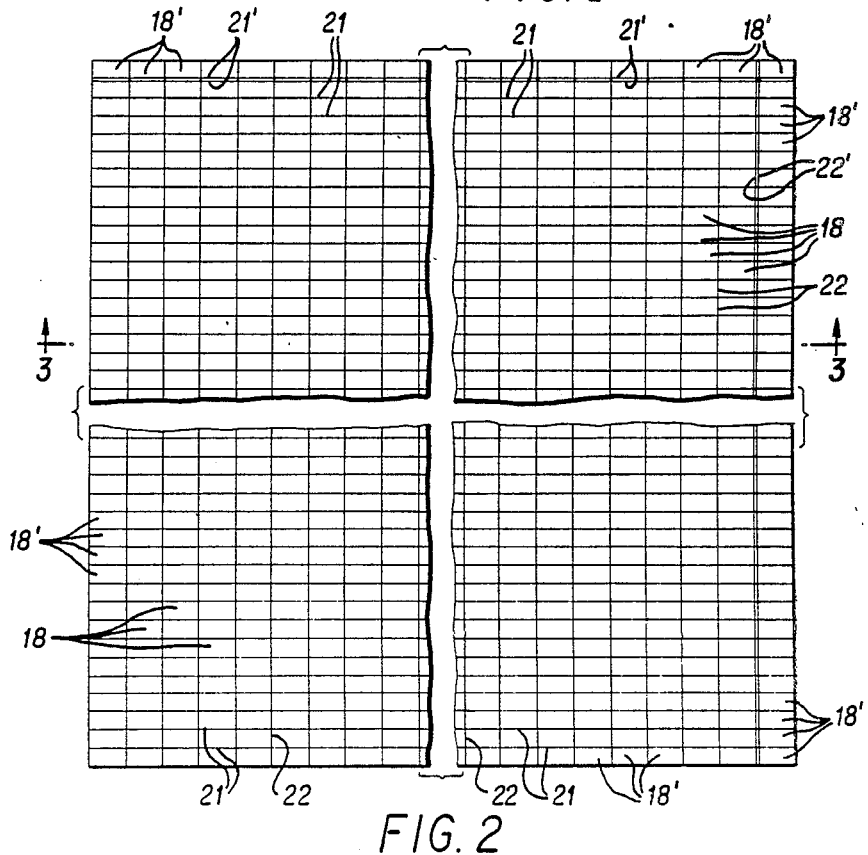
FIG. 2 is an elevational view, with portions broken away, of a color module preferably of 128×384 pixels suitable for use in the display of FIG. 1.
Figure 3:
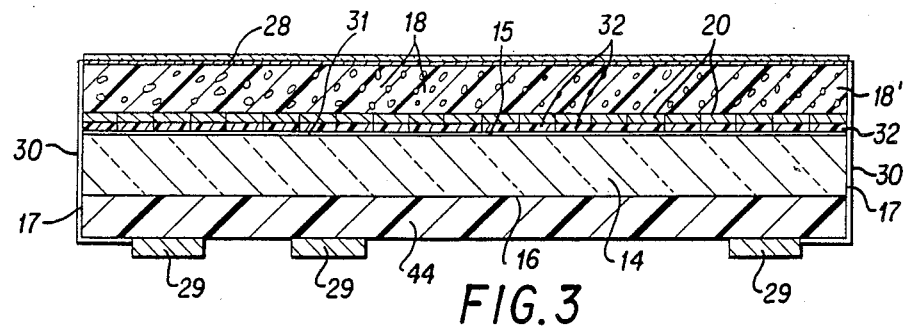
FIG. 3 is a cross-sectional view of a module as shown along line 3—3 of FIG. 2.
Figure 4A:
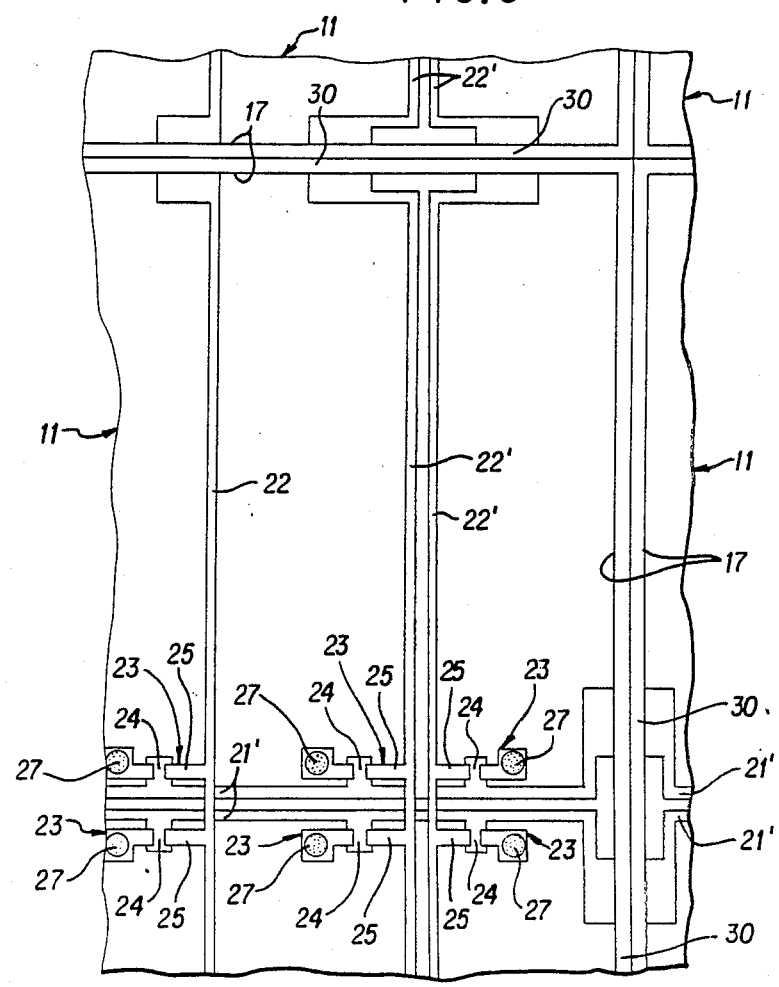
FIG. 4a is an enlarged fragmentary elevational view of one corner of the module shown in FIG. 2, in relation to adjacent similar modules.
Figure 4B:
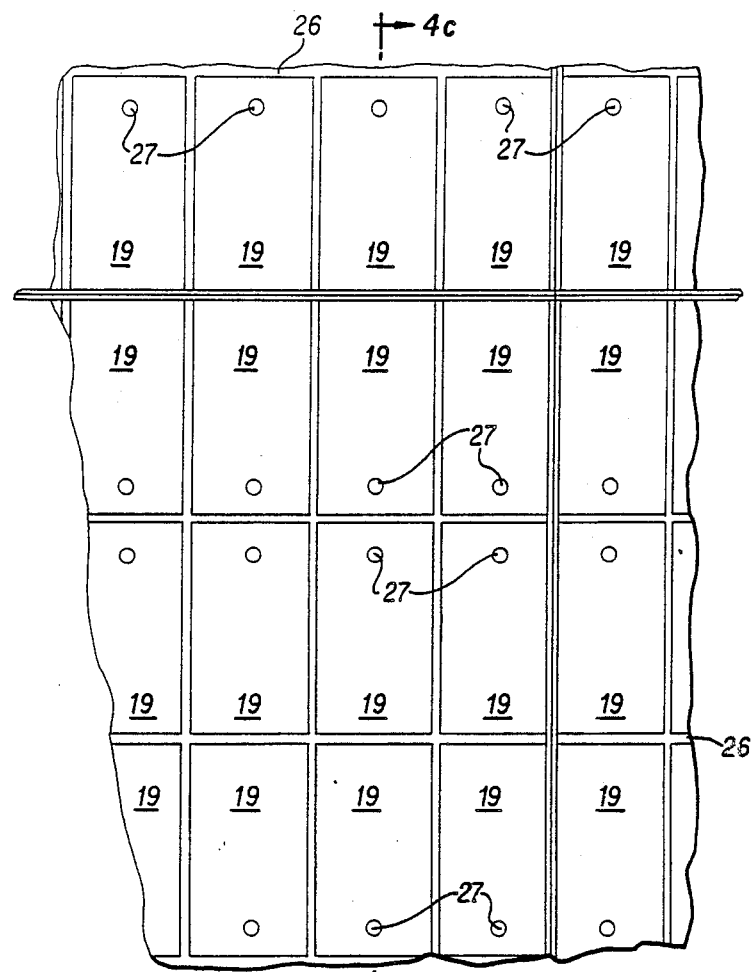
FIG. 4b is an enlarged fragmentary elevational view of one corner of the module corresponding to FIG. 4a showing a different layer of the switching elements, a layer which defines the picture elements.

Referring to FIGS. 2, 3, 4a, 4b, 4c, 5 and 6, a suitable reflective module 11 for the flat-screen television display 10 is shown in detail. Each module has a substrate 14 (shown in FIG. 3), typically of glass, having first major surface 15, second major surface 16 and edge surfaces 17. A matrix of picture elements 18 extends over first major surface 15 of substrate 14 in a regular pattern, as best shown in FIG. 2, typically in a 128×128 or 144×192 pattern. Picture elements 18 are of substantially the same shape and area so that an observer cannot visually distinguish a difference in the regular pattern. The boundary picture elements 18', defined by conductive pads 19 as described below, adjacent the edge surfaces 17 of substrate 14 are positioned from the edge surface 17 such that the regular pattern is substantially continued uninterrupted between adjacent modules as illustrated in FIG. 4b. This configuration provides a module with, for example, 21⅛ rows of picture elements per inch for a module of 6×6 inches or 6×8 inches. The picture elements 18 are preferably formed in a light modulating film composed of a liquid crystal dispersion in a polymeric binder as described in U.S. Pat. Nos. 4,435,047 and 4,688,900, and the picture elements are defined by conductive pads 19 of switching elements 20 as described below.

Figure 4C:
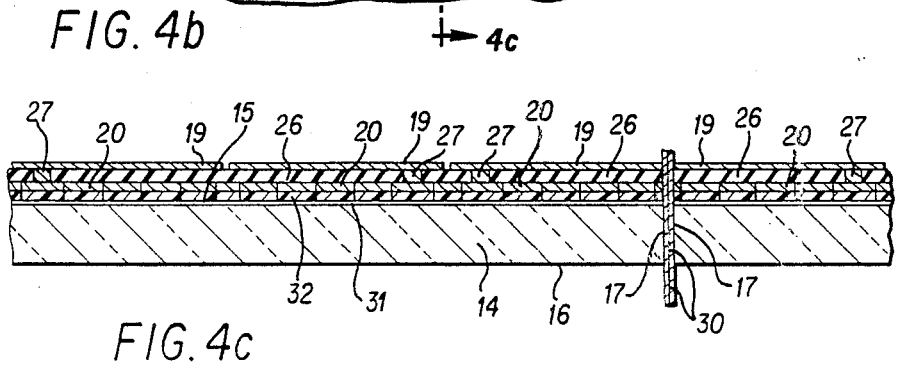
FIG. 4c is a cross-sectional view taken along line 4c—4c of FIG. 4b.

Within each module 11, positioned adjacent the picture elements 18 are electrical switching elements 20 extending over first major surface 15 of substrate 14. Each switching element 20 is capable of activating a picture element 18 upon receiving electrical signals through a row conductive strip 21 and a column conductive strip 22. Alternatively, switching element 20 may be provided by multiplexing with the row and column coordinates applied to opposite sides of a light modulating film containing picture elements 18.

Where a light modulating film is used to provide picture elements 18, each electrical switching element 20 is preferably comprised of a thin film transistor 23 having a gate 24 electrically connected to a row conductive strip 21 and a source 25 electrically connected to a column conductive strip 22. It should be noted that, using techniques well-known in the art, an insulating layer is positioned between the intersection of conductive strips 21 and 22 and between the intersection of gate 24 and the semiconductor extending from source 25 to drain 27. As a part of each switching element 20, insulating layer 26 is placed over the entire first major surface 15, including conductive strips 21 and 22 and transistors 23 except at drains 27 of transistors 23, and then as shown in FIG. 4c, transparent conductive pads 19 of, for example, indium tin oxide is placed over the insulating layer 26 in contact with the light modulating film to define picture elements 18 and 18' in the light modulating film. Each conductive pad 19 is electrically charged through the drain 27 of a transistor 23. The electrical circuit of switching element 20 is completed by a transparent conductive layer 28 on the opposite surface of light modulating film containing picture elements 18 and 18' connected to a common ground or to interconnecting conductors as hereinafter described. The latter alternative also allows the alternative of allowing the light modulating film common to all modules 11 in display 10, to which conductive pads 19 of each module in the array make electrical contact. By this layered arrangement of switching elements 20 (shown in FIGS. 4a, 4b and 4c), picture elements 18 and 18' can take up a larger area of module 11 and a brighter television image can be reproduced.

Figure 6:
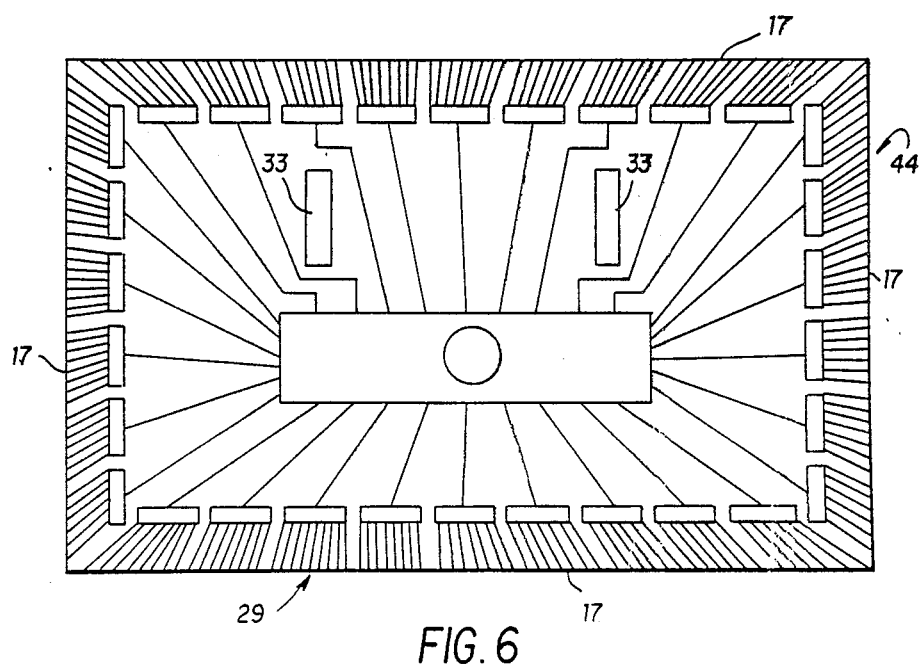
FIG. 6 is a back elevational view of a module as shown in FIG. 2.

Row and column conductive strips 21 and 22 each extend over first major surface 15 of substrate 14 from adjacent edge surface 17 to adjacent, opposite edge surface 17 such that each electrical switching element 20 can be electrically activated by both a row conductive strip 21 or 21' and a column conductive strip 22 or 22'. Each conductive strip 21 and 22 also is enlarged in area adjacent edge surface 17 as shown in FIG. 4a and wraps around from first major surface 15 to an edge surface 17, to allow for electrical interconnection with electrical drive circuit 29. Electrical drive circuit 29 is positioned adjacent the second major surface 16 of substrate 14 on printed circuit board 44, which is then laminated to second major surface 16 of substrate 14 (as shown in FIG. 3). Alternatively, electrical drive circuit 29 could be directly positioned or formed on second major surface 16 of substrate 14, rather than on a separate printed circuit board 44 that is then laminated to second major surface 16. Electrical drive circuit 29, the positioning of which is best shown in FIG. 6, preferably has a fan-in electrical connecting configuration to be capable of electrically activating all switching elements 20 in the module 11 corresponding to the desired video images to be formed by picture elements 18 on first major surface 15 of substrate 14.

Figure 5:
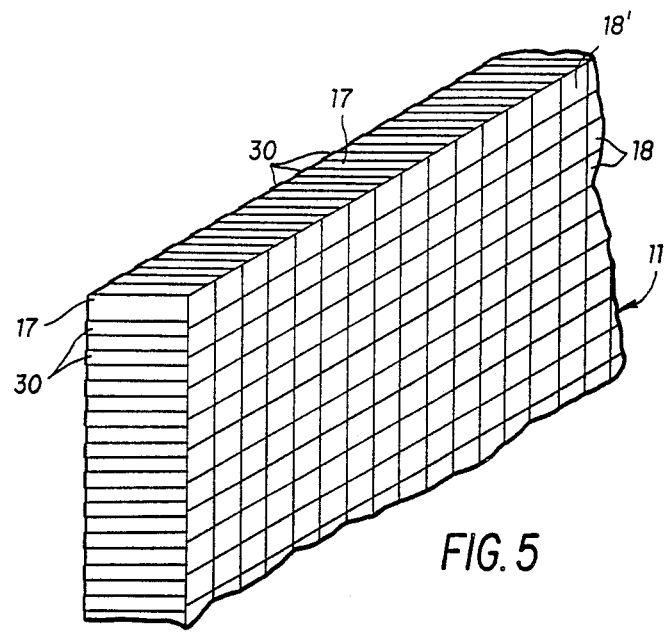
FIG. 5 is a fragmentary isometric view of a module as shown in FIG. 2.

Interconnecting conductors 30 connect electrical drive circuit 29 to row conductive strips 21 and 21' and column conductive strips 22 and 22'. Although other embodiments such as feed-through interconnection could be utilized, interconnecting conductors 30 are preferably positioned over edge surfaces 17 (as shown in FIGS. 3 and 5) and wrap around second major surface 16 to electrically connect conductive strips 21, 21', 22 and 22' to electrical drive circuit 29. Interconnecting conductors 30 can be made by traditional metallization and photolithographic techniques on the adhesive side of a thin, insulating tape typically about one mil in thickness. The insulating tape 30a with interconnecting conductors 30 is preferably placed over edge surfaces 17 after drive circuit 29 is positioned relative to second major surface 16 of substrate 14. However formed, the interconnecting conductors 30 are electrically insulated from like interconnecting conductors of adjacent modules. The thickness of the interconnecting conductors 30 should be such as to provide uniform spacing, and generally minimal spacing, between modules 11 in the array of display 10 (as shown in FIG. 4a).

Interconnecting conductors 30 may also extend along edge surface 17 to a distance beyond major surface 15 at the corners of each module 11 to electrically connect conductive layer 28 to electrical drive circuit 29. Alternatively, however, the circuit can be completed by electrically connecting conductive layer 28 to a common ground provided, for example, by forming a transparent conductive layer over the inside surface of front glass 13 (FIG. 14) of display 10 to which layer 28 can make electrical contact.

Preferably at least one set of row and one set of column conductive strips 21' and 22' are provided side by side while retaining the corresponding distance between picture elements 18 of the matrix as shown in FIG. 2. In this embodiment, the corresponding distance between picture elements 18 and 18' of the matrix is maintained since the conductive pads 19 defining the picture elements are in a different plane from conductive strips 21' and 22'. Conductive pads 19 are as large in area as space will permit without extending over conductive strips 21, 21', 22 and 22'. This arrangement allows conductive strips 21' or 22' to avoid running close to an edge surface 17. The side-by-side row and column conductive strips 21' and 22' may occur only once on each module 11. This requires, however, the use of an asymmetric mask in the formation of the conductive strips, affecting the manufacture of each module 11. It may be appropriate, particularly in embodiments as shown in FIG. 4, where the switching elements 20 are in layers, as described above, and in turn the spacing between side-by-side row and column conductive strips can be relatively large, to utilize a symmetric photo mask so that all row and column conductive strips are in side-by-side sets. This pattern, called a "butterfly pattern", would repeat the pairing of conductive strips 21' and 22' over the entire surface 15 of substrate 14, with the advantage of providing redundant conductive strips and increasing the manufacturing yields of modules 11.

Since the particular module 11 shown in FIGS. 2 through 6 is a reflective embodiment capable of reproducing color television images, a mirrored surface 31 is provided on first major surface 15 of substrate 14 over which picture elements 18, switching elements 20 and conductive strips 21, 21', 22 and 22' are positioned. Preferably, an opaque mask layer is then provided in the areas of the conductive strips and the thin film transistors to improve the contrast of the reproduced video picture. Also, to allow for the reproduction of color images, color filter 32 (FIGS. 3 or 9) is positioned between picture elements 18 and first major surface 15 of substrate 14. Color filter 32 typically has red, green and blue components with these primary colors alternating over picture elements 18 by rows or columns, or other conventioned configurations such as color triplets or quads. Each picture element 18 corresponds with one of the primary colors to produce that color component of a color television image to be reproduced. The color filter 32 can alternatively have other positions in the module than shown in FIG. 3, such as adjacent conductive layer 28. It should not, however, be positioned spaced-apart from the picture element 18 to avoid light parallax.

The flat-screen color television display of FIG. 1 also has an electrical control circuit capable of categorizing incoming electrical picture signals as to the corresponding modules 11 in the array and directing the electrical signals to electrical drive circuits 29 on each module 11 corresponding to the portion of the television picture to be reproduced by picture elements 18 on that module 11. The specifics of the electronic drive and control circuitry are described later, beginning on page 23.

In some embodiments, each module 11 can be removed from the array of the display shown in FIG. 1, and replaced by a like module 11. To facilitate this, handles 33 are provided on the back of each module 11 as shown in FIG. 6. By being removable, the flat-screen television display can be repaired with relatively low cost if a localized defect develops in the display.

Figure 7:
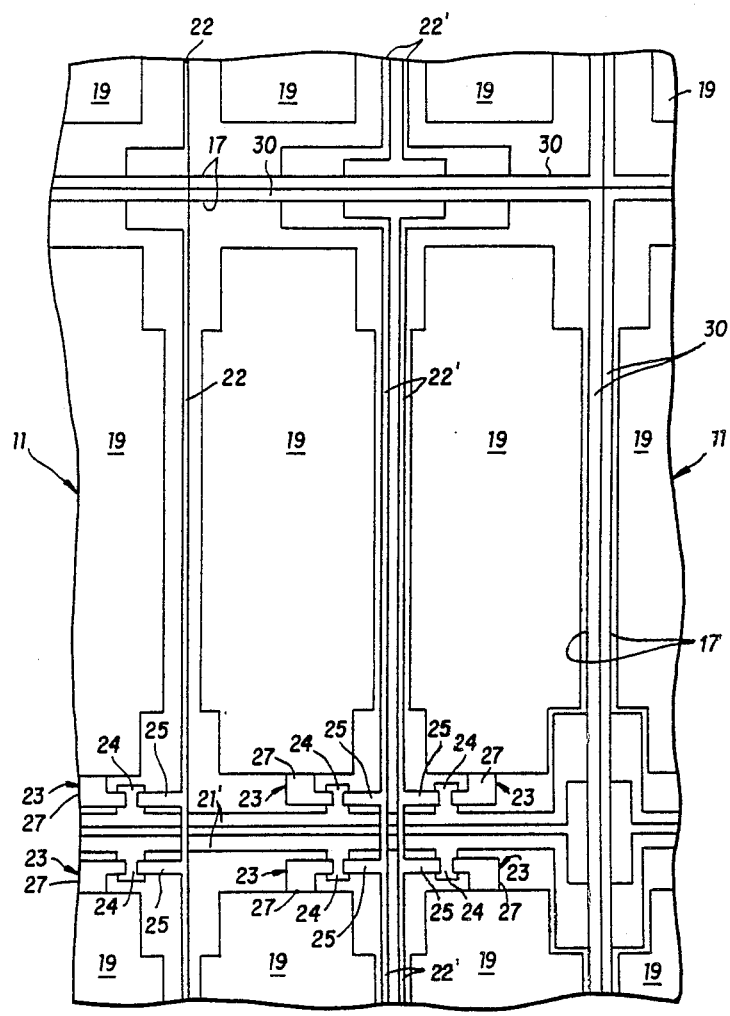
FIG. 7 is an enlarged fragmentary elevational view of a first alternative embodiment of one corner of the module as shown in FIG. 2, in relation to adjacent similar modules.

Referring to FIG. 7, an alternative embodiment for module 11 is shown where the matrix of switching elements 20 is made in one layer rather than three as described above with reference to FIGS. 4a, 4b and 4c. Specifically, conductive pads 19, typically of indium tin oxide to provide transparency, are in the same layer as the thin film transistor 23. This requires that each conductive pad 19, which is in contact with the light modulating film and defines a picture element 18 be spaced from conductive strips 21, 21', 22 and 22' and transistor 23, except for drain 27 thereof which electrically powers the conductive pad 19. Again, as previously explained, the light modulating film may be common to all modules 11 in display 10 or part of each module 11. This embodiment has the advantage of reducing the number of manufacturing steps in making modules 11 and particularly the switching elements 20 for the modules 11. However, it has the disadvantage of reducing the area corresponding to the first major surface 15 of the substrate which is available for the picture elements 18. Each conductive pad 19 defining a picture element 18 is substantially the same to avoid the observer from visually detecting irregularities in the pattern of the matrix of picture elements 18. The difference in area between this embodiment and that with the multiple layer switching element 20 can be seen by comparing FIGS. 4 and 7. However, even in this embodiment, for presently available resolution, the area of module 11 available for use as picture elements 18 is approximately 55% of the total area corresponding to major surface 15 of substrate 14, compared with 30% of the corresponding area of a cathode ray tube display which is currently used for reproducing color television images.

Figure 8:
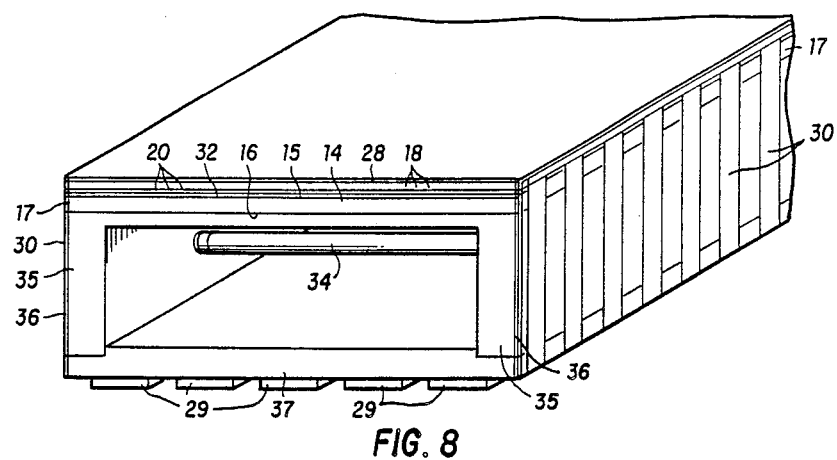
FIG. 8 is an alternative embodiment of the module as shown in FIGS. 2 and 3.
Figure 9:
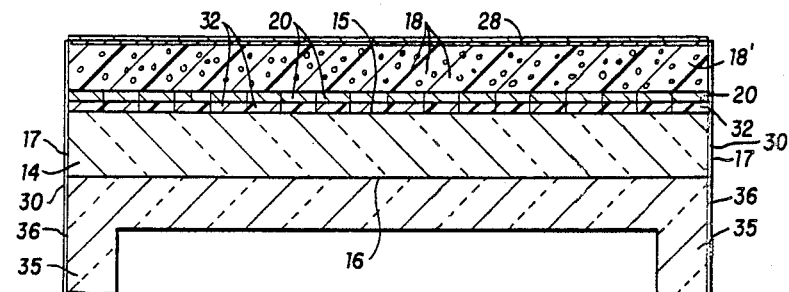
FIG. 9 is a cross-sectional view of the module shown in FIG. 8.

Referring to FIGS. 8 and 9, an alternative embodiment of module 11 that is transmissive is shown. In this embodiment, substrate 14, picture elements 18, switching elements 20 and color filter 32 are all the same as alternatively described above with reference to FIGS. 2 through 6. In this embodiment there is not a mirrored surface 31. Rather, light source 34 is positioned adjacent second major surface 16 of substrate 14. Light source 34 is surrounded by frame 35 positioned adjacent surfaces 17 of substrate 14 and having edge surfaces 36 which are extensions of edge surfaces 17 of substrate 14. Frame 35 is a transparent plastic, such as Perspex TM, capable of transmitting light from light source 34 to substrate 14 and providing a support for substrate 14. Backer board 37 is positioned adjacent light source 34 opposite second major surface 16 of substrate 14 and has electrical drive circuits 29 positioned on it. Further, interconnecting conductors 30 adjacent edge surfaces 17 of substrate 14 extend over edge surfaces 36 of frame 35 electrically connecting drive circuit 29 on backer board 37 with row and column conductive strips 21, 21', 22 and 22' adjacent first major surface 15 of substrate 14. Again, interconnecting conductors 30 are electrically insulated from like interconnecting conductors of adjacent modules. The difference between this transmissive embodiment module 11 and the reflective embodiment of module 11 can be seen by comparison of FIGS. 3 and 9. Again, as described above, the light modulating film may be made part of display 10 common to all modules 11 to which the conductive pads 19 of each module 11 electrically connect, or made separately a part of each module 11.

Referring to FIGS. 10 and 11, a further alternative embodiment of module 11 that is transmissive is shown. In this embodiment, module 11 does not contain the light source 34, but rather light source 34 is common to all modules 11 in the display 10. In addition, electrical drive circuit 29 is positioned more specifically adjacent edge surfaces 36 of frame 35 and backer board 37 is spaced from module 11 and is common to all modules in display 10. The electrical connection from an electrical control circuit (not shown) to drive circuit 29 is made through a lattice-type plug 38 into which modules 11 can be inserted and electrical connection made, and removed to form display 10. This embodiment has the advantage of providing more uniform backlighting with light source 34 common over display 10. Common light source 34 provides light through frame 35 capable of transmitting light to substrate 14. The other aspects and alternatives of the construction of this module are those described above with reference to FIGS. 8 and 9.

Figure 12:
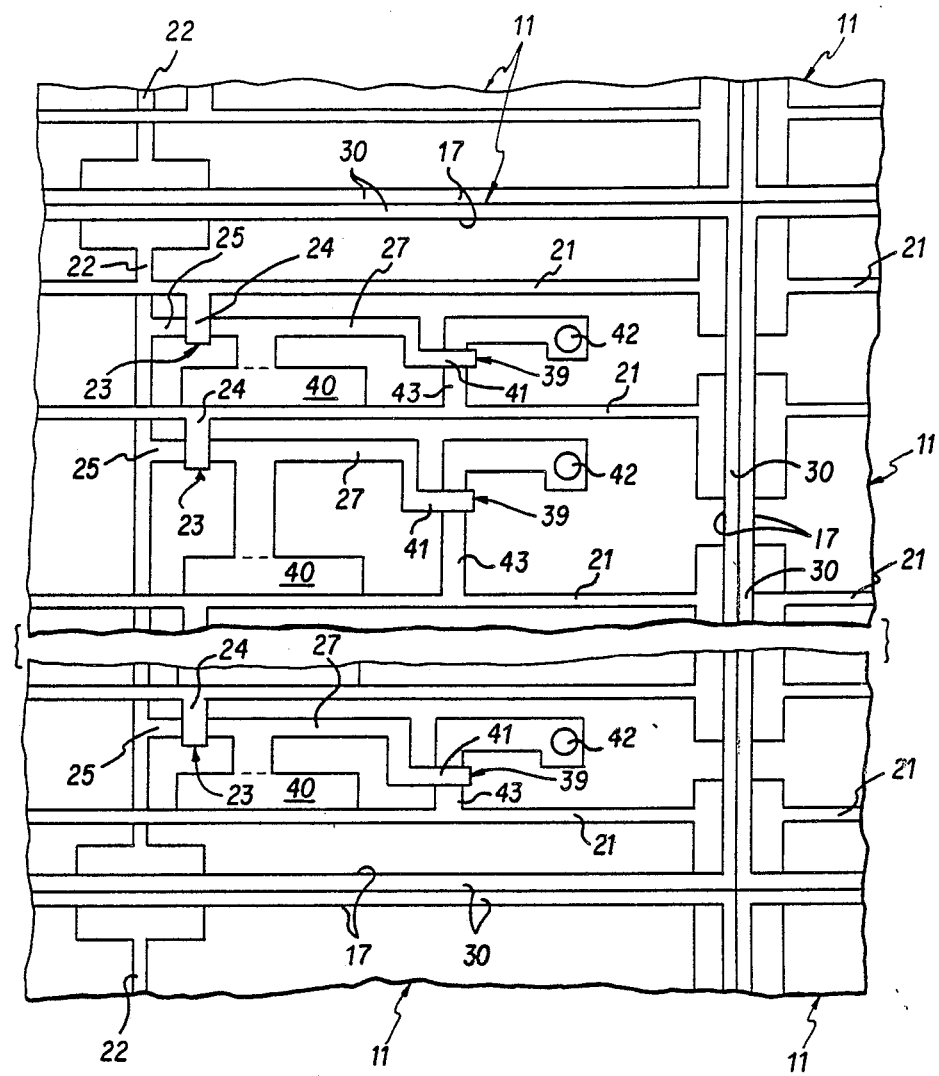
FIG. 12 is an enlarged fragmentary elevational view of a second alternative embodiment of two corners of the module as shown in FIG. 2, in relation to adjacent like modules.

Referring to FIG. 12, an emissive embodiment of module 11 and its relation to like modules in a display 10 is shown. In this embodiment, an electroluminescent phosphor layer of appropriate color or colors forms picture elements 18 in contact with conductive pads 19, instead of a light modulating film. The construction of module 11 is otherwise substantially the same as described with reference to FIGS. 4a, 4b and 4c, except that color filter 32 may be used depending on the availability of appropriate electroluminescent phosphors to form colors, and that conductive pads 19 can be metallic (non-transparent), preferably with the upper surface able to reflect radiation emitted from the picture element 18 toward the front viewing surface of display 10. Electrical connections of drive circuit 29 to the row and column conductive strips 21 and 22 are also the same as described above with reference to FIGS. 4a, 4b and 4c. The switching elements 20 in this embodiment differ, however, in that each contains a second thin film transistor 39 and a storage capacitor 40. Gate 41 of second thin film transistor 39 is electrically connected to drain 27 of thin film transistor 23 and to the storage signal side of capacitor 40. Drain 42 of second thin film transistor 39 is connected to conductive pad 19 which in turn is a terminal of electroluminescent picture element 18. Source 43 of second thin film transistor 39 and the other terminal of storage capacitor 40 are electrically connected to the adjacent row conductive strip 21. Capacitor 40 is a three-layer structure with the top layer (shown in FIG. 12) the storage signal side and the bottom layer the feed signal side connected to conductive strips 21, with an insulating layer to maintain capacitance between them.

In this embodiment, the vertical scan register of the electrical control circuit (described later) includes means for connecting a given row conductive strip 21 to the vertical scan switching signal input, while connecting all other row conductive strips 21 to a reference signal which is typically at ground level. This arrangement permits simultaneous application of a uniform reference signal and an information signal applied by column conductive strips 22 to picture element 18 and also permits a return path for the current flowing through the electroluminescent picture elements 18 from the conductive layer 28. The common reference level is normally connected to the power supply to complete the circuit. This arrangement for switching elements 20 provides an active matrix circuit suitable to switch the substantially higher voltages that are needed for control of electroluminescent phosphor picture elements 18. The high voltage, thin film transistors used in this embodiment are preferably made using cadmium selenide with a thicker insulator layer between the semiconductor film and the gate electrode.

Figure 13:
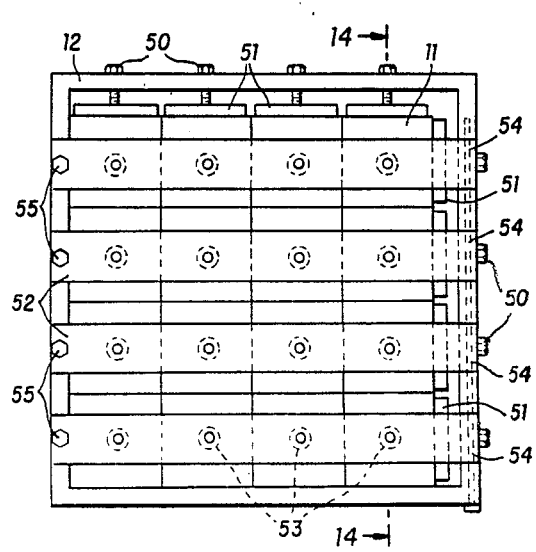
FIG. 13 is a back elevational view of the modular flat-screen television display of FIG. 1.
Figure 14:
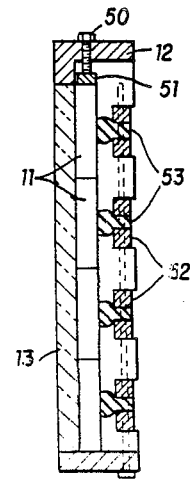
FIG. 14 is a cross-sectional view taken along line 14—14 of FIG. 13.

Referring to FIGS. 13 and 14, the support structure for the flat-screen television display shown in FIG. 1 is detailed. This support structure is particularly adapted to allow for removal of modules 11 and repair of the display 10 during manufacture, testing and subsequent use. Bolts 50 are threaded through the sides of frame 12 and contact, by pads 51, individual rows and columns in the 4×4 array of modules 11 in flat-screen television display 10. Bolts 50 through pads 51 and the opposite side of frame 12 exert a compressive force on the modules 11 to hold them in close contact. Also, to hold the modules 11 in position against glass 13 hinged bars 52 are provided for each row of modules 11 on array. Individual resilient pads 53 are positioned on each bar 52 to exert an oppressive force against the back of modules 11 thereby forcing them against the glass 13. The bars 52 are also hinged at 54 and attached by other suitable fasteners 55 at the opposite end to frame 12.

When it is desired to replace a module 11 in the flat-screen television display, fastener 55 is loosened and bar 52 corresponding to the row in which the module 11 that is to be replaced is located is swung away. Bolts 50 for both the column and row in which the module to be replaced is located are then loosened and the module removed from the array and a like module put in its place. The bolts 50 are then retightened, the bar 52 swung in position and then fastened with fastener 55.

Electronic Drive Circuitry For Modular Flat-Screen Televisions.

Conventional video signals are time sequential signals consisting of a high speed serial analog data stream. Typically, an image or frame is built up using a number of horizontal lines that are laid down consecutively. The lines may be laid down sequentially or in an interlaced manner. In the latter case, the odd numbered lines of the image are laid down by a first scan, and then a second scan lays down the even numbered lines. This process can be done on a panel-wide basis or on a per module basis. The electrical control circuit for a flat-screen television display generates the correct sequence of enabling signals to activate the electrical drive circuits and direct the video signal to the appropriate horizontal rows and vertical columns of the entire display or of each module.

In one embodiment the electrical switching elements of the modules are addressed a row at a time by activating an entire horizontal row of picture elements in a module simultaneously and applying the appropriate portion of the sampled video signal corresponding to the picture elements 18 for that row of that module 11 to all of the columns of that module 11. The process is then repeated row-by-row, module-by-module until the entire display 10 has been addressed. For purpose of explanation, FIG. 2 shows some of the rows and columns which will be activated. At the start of a frame, row 1 of the first module would be activated and the first 128 samples of the video signal would be switched into the first 128 picture elements thereof at the same time. Then row 1 of the second module would be activated and the next 128 samples of the video signal would be switched into the first 128 picture elements thereof. The same process would be repeated for the third and fourth modules. For a sequential video signal, this process would be repeated in sequence with row 2 being activated so that samples of the video signal are switched to the second 128 picture elements in each of the first four modules. Row 2 of the second, third and fourth modules are similarly activated. This process is repeated until all of the picture elements 18 in the first four modules have been activated. To complete the frame, this process is repeated for the fifth to eighth, ninth to twelfth and finally the thirteenth to sixteenth modules. For an interlaced video signal, the second rows to be activated would be the third rows of the modules. After all the odd rows had been filled for the frame, the process would repeat for the even rows of all the modules. Alternatively, at the start of a frame, the first rows of the first four modules could be activated at the same time and the first 512 (4×128) samples of the video signal could be switched into the first 128 picture elements in each module simultaneously. Then the second row of the first four modules would be activated and the next 512 samples of the video signal could be simultaneously switched into the second 128 picture elements of each module. This process is similar to the one described above for activating each module except that four modules are treated as a unit so that the frame is filled on a panel basis rather than a module basis.

Unfortunately, the rate at which the serial video signal arrives and, therefore, the rate at which it must be sampled generally exceeds the rate at which the modules can accept the video data samples. It is, therefore, necessary to use a storage device to store the data from the incoming video signal and pass portions thereof to the appropriate modules in parallel. The storage devices for each module can form part of the electrical drive circuits, can be part of the electrical control circuit, or both. When the storage devices are part of the electrical drive circuits, it is convenient to make the number of data samples stored equal to the number of picture elements in one row of one module. Since it takes time to transfer the data samples from the storage device to the module, it is often necessary to use two sets of storage devices and store the samples in one memory while the previously stored data samples are being transferred from another memory to the module. Due to the row selection process, if only one row of the entire display 10 is activated at a given time, all of the corresponding column elements of each column of modules can be connected in parallel and only two storage devices or memories are needed for each column of the entire display 10.

Preferably, digital serial-input parallel-output shift registers are used as the storage devices in this configuration. To obtain a satisfactory gray scale, a minimum of 6-bits is necessary and it would be preferable to use 8-bits. Making the storage devices in this way requires the use of an analog-to-digital converter at the input to the storage device and a digital-to-analog converter for each of the parallel outputs. The analog-to-digital converter could be made to serve both sets of storage devices, but digital-to-analog converters would be required for every element of both sets of storage devices. One set of digital-to-analog converters could possibly be used, but complicated switching would be needed at both the input and the output of the digital-to-analog converters.

This method of activation can be implemented by known electronic circuitry. While it is similar to what is currently done for flat-screen television, it fails to take advantage of the modularization of the present invention. It is preferable to present the video data to all modules simultaneously. This would simplify the control circuitry and decrease the required response time. In order to achieve the desired serial to parallel transformation of the video data, the data must first be stored in a memory. Several methods are known, but the most advantageous from a data-integrity and manipulative standpoint is to transform the analog video data into a digital form and store it a frame or a field at a time. This permits all the modules of the display to be updated at the same time, thus providing a significant relief on the updating speed required for each module since an entire frame period is available for such updating instead of just that portion of the frame period which corresponds to the image portion displayed by the particular module. Thus, if there are n modules in total, then the update time available for each module is increased by the factor n, compared with the serial updating of the screen described above. This parallel addressing of all the modules is a unique advantage of the present invention.

Typical television "frame grabbers" have only one serial analog signal input and one serial analog signal output for displaying a full frame. The circuitry of the present embodiment is capable of accepting the incoming serial video data and generating multiple analog output signals so that data can be presented to all modules simultaneously. This enables the video signal information to be provided to the modules simultaneously instead of sequentially. For a color video display, the entire frame is preferably stored as three separate video frames (one per color), and the video data for each color is presented to the modules as a number of parallel data streams.

Figure 15:
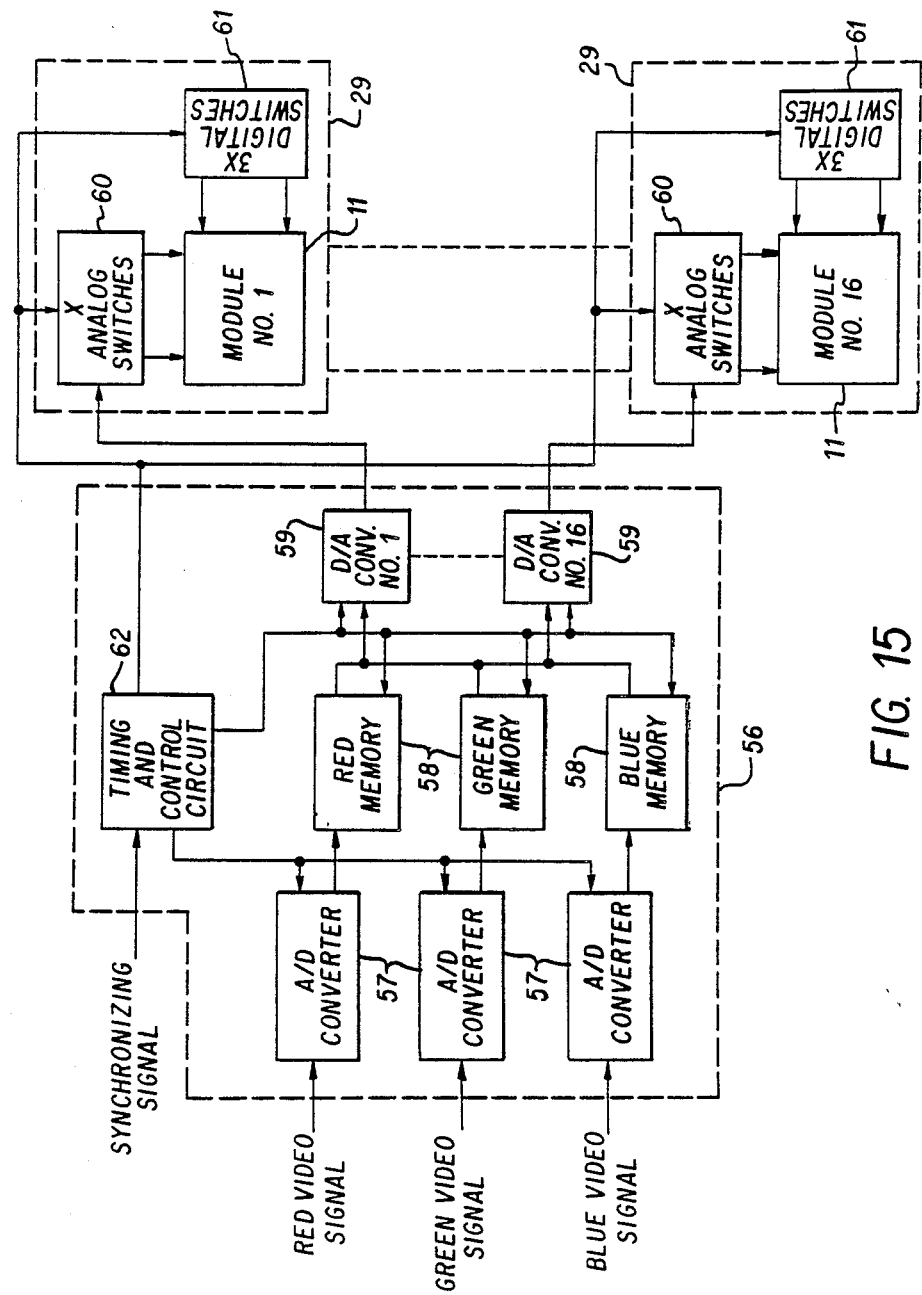
FIG. 15 is a block diagram illustrating the electronic circuitry for controlling and driving the modular flat-screen television display of FIG. 1 wherein like color picture elements are arranged in horizontal rows.

In standard television signals, color images are represented as luminance, hue and saturation data which can be decomposed into the three primary colors red, blue and green. This information can be extracted from standard video signals such as NTSC, PAL or SECAM by conventional techniques, such as multiplexing. Preferably, a decoder circuit, which is well known in the art, performs this function. In the preferred embodiment as shown in FIG. 15, the extracted red, blue and green analog video signals from the decoder circuit are each digitized in an image processor 56 by means of an analog-to-digital converter (ADC) 57 and are each stored digitally as successive bytes of data, one corresponding to each picture element in a frame. The data for each color is stored in separate random access memories (RAM) 58, which send the video data to each module as needed. Preferably, there are two memories for each color which are dual ported. While one memory is being updated serially at the frame rate, the other memory is being read out in a serial-parallel mode at the module rate. This allows each module to be updated independently of the other modules. In order to display the digitally stored data in a parallel fashion on a per module basis, it must be converted back into an analog signal. This can be accomplished by using a digital-to-analog converter (DAC) 59 with a digital latch for each module in the system.

Using an image processor such as shown in FIG. 15 has the added advantage that the bandwidth needed for addressing and driving the modules is reduced by a factor of n where n is the modularity factor. Thus, if the video bandwidth is 20 MHz and there are 16 modules (n=16), then each module would have a video bandwidth of only 1.25 MHz, greatly alleviating the speed requirements on the active matrix and the electrical drive circuit 29 of each module. It should also be noted that the price of digital memory is continually decreasing and very large memories with fast access times are currently available at a low cost. This is another reason for having the memory be part of the image processor 56 rather than part of the drive circuits 29 on modules 11.

Figure 16:
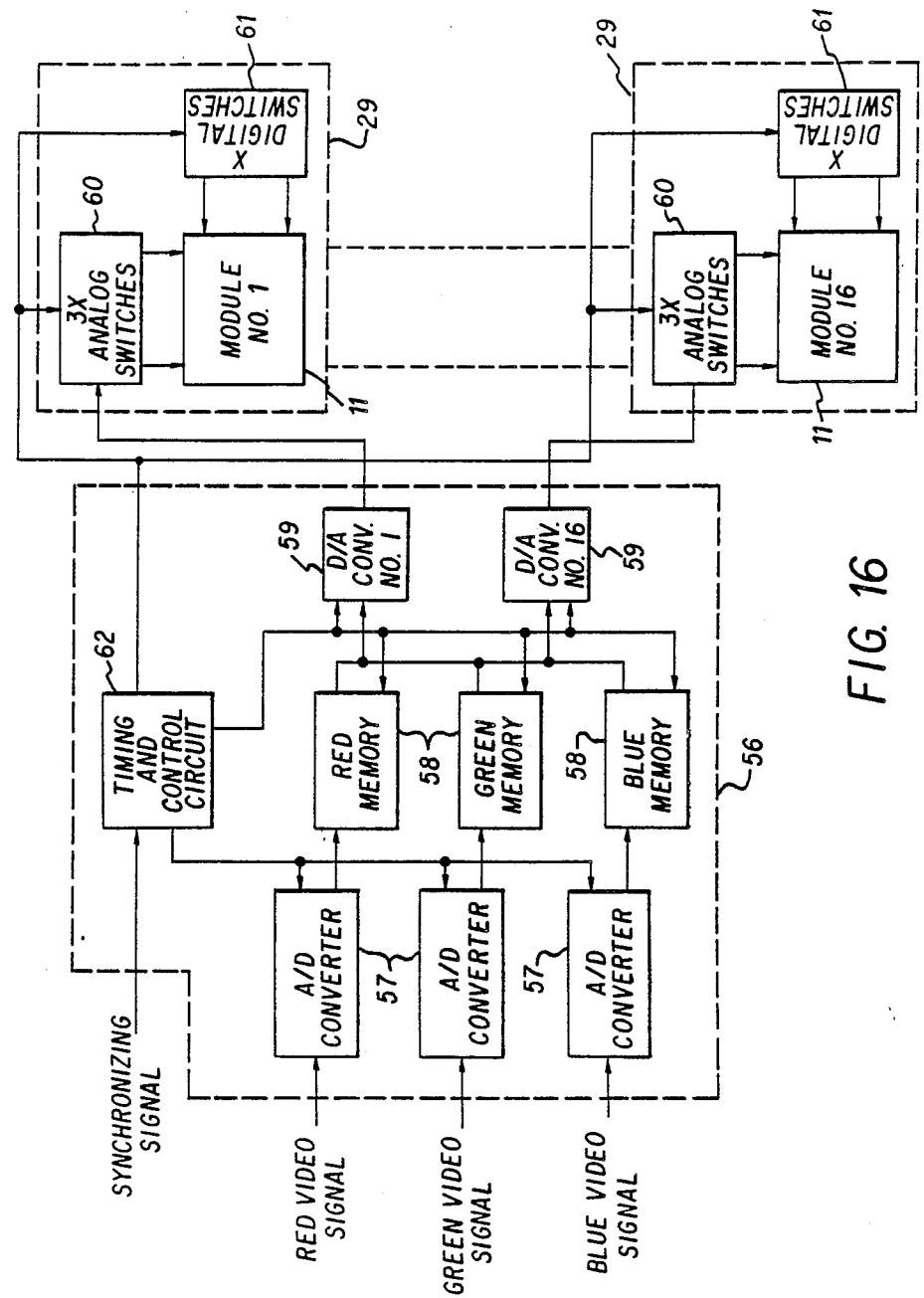
FIG. 16 is a block diagram illustrating the electronic circuitry for controlling and driving the modular flat-screen television display of FIG. 1 wherein like color picture elements are arranged in vertical columns.

In the updating process, the three colors can be presented to each module, in parallel, or the colors can be scanned sequentially on a per module on a per panel basis. By presenting the colors in sequence, the analog portion of the electronics required for the electrical drive circuit 29 of each module can be reduced by a factor of three. (Compare FIGS. 15 and 16). In FIG. 16, three columns, one for each color picture element and each having an analog switch 60 need to be driven. This results in the number of analog switches 60 being three times the number of digital switches 61 in FIG. 15, however, only one column with one analog switch 60 needs to be driven while the three colors are presented sequentially with a successive row being enabled for each color. This mode of operation essentially involves forming rows, instead of columns, of the colors red-green-blue, and requires the scanning of three lines of each module for each line of the video input. If the colors are presented in parallel on all the columns (strips), then three times as many column strips are needed, but the row scan rate is reduced by a factor of three. The color sequential solution is preferred. This reduces the number of analog switches 60 needed to drive the column strips while increasing the number of digital switches 61 needed for the row strips by a factor of three. However, since digital switches 61 are easier to realize, this alternative gives an overall cost saving. The higher required row scan rate is not a serious drawback: if there are, for example, 16 modules, in a 4×4 array as illustrated in FIG. 1, this arrangement will result in a row scan rate which is ¾ of the video rate, and a column scan rate which is 1/12 of the video rate, resulting in a reduction to ¾×1/12=1/16 of the original video rate.

Figure 17:
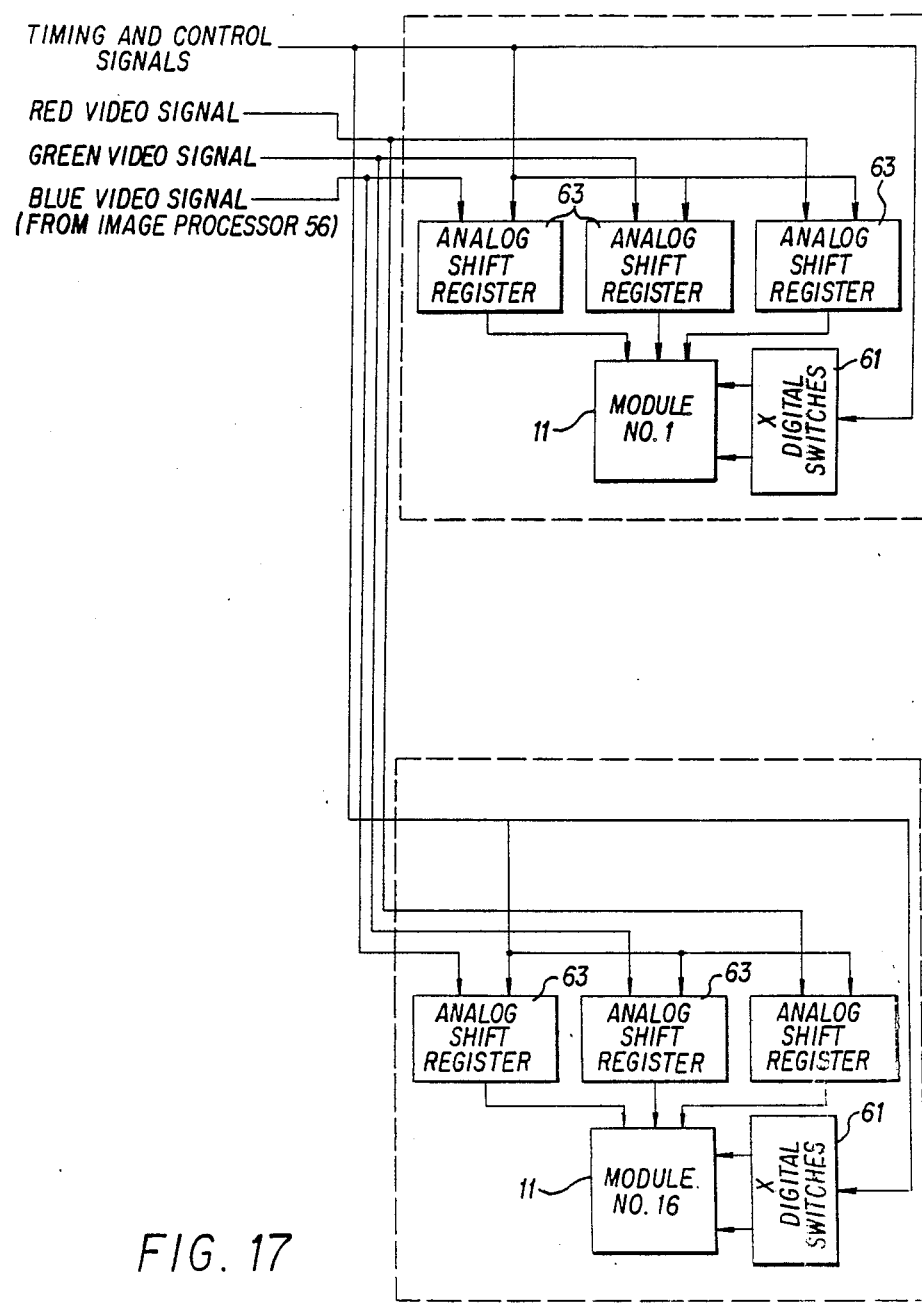
FIG. 17 is a block diagram illustrating the electronic circuitry for controlling and driving the modular flat-screen television display of FIG. 1 using analog shift registers.

A further reduction in the rate at which information is actually transferred to the picture elements 18 of each module 11 can be achieved if all picture elements in a given row of a module are addressed simultaneously, i.e., if row-at-a-time addressing as discussed above is employed. This can be accomplished through using charge-coupled devices (CCD), bucket-brigade devices or other appropriate means in an analog shift-register configuration such as shown in FIG. 17, rather than analog switches as shown in FIG. 16. Although there are today no commercially available analog shift-registers which accept serial data as inputs and output parallel data, the design and fabrication of such integrated circuits is certainly within the capability of current technology. This approach would have the advantage of further reducing the speed of addressing individual picture elements by a factor equal to the number of picture elements in each row of a module, e.g., 128. A combination of analog shift-register and analog holding register 63 can be used to permit simultaneous readout, in parallel, of one line of data while the succeeding line of data is being clocked into the shift-register from the image processor 56.

As previously discussed, the three colors can be presented from the image processor 56 to the modules 11 either in parallel or sequentially. The embodiment shown in FIG. 17 contemplates parallel transfer of the color information from the image processor 56 to the modules 11, analogous to the technique illustrated in FIG. 16. An alternative embodiment of the method illustrated in FIG. 17 which is analogous to the technique illustrated in FIG. 15 is possible and in fact preferred since it reduces the number of analog shift registers 63 for each module 11 from three to one while increasing the number of digital switches 61 from X to 3X.

It is the purpose of the timing and control circuit 62, shown in FIGS. 15 and 16, to generate all of the necessary clocking and gating wave forms needed by the A/D converters 57, memories 56, D/A converters 59, digital switches 61, analog switches 62 and analog shift registers 63 to effect proper processing and routing of the incoming video picture signal to the correct picture elements on display 10. The clocking and gating wave forms must be synchronized to the incoming video signal. This is generally accomplished by having an accurate master clock operating at a high multiple of the horizontal input frequency and precisely synchronized to the horizontal input frequency. This clock signal, along with the horizontal and vertical synchronizing input signals, controls a variety of digital counters. Appropriate logical combinations of the decoded counter outputs can produce all of the required clocking and gating wave forms. Implementation of such circuitry involves standard phase locked loop, counter and logic circuit technology well known in the art. Alternative to using counters and specific logic circuitry, a microprocessor running from the master clock can be employed to generate the required timing and control signals.

The modular flat television screen, driven by the electronic system described above, can be considered as a sophisticated color video display monitor. By conventional, present day techniques it can be used to present standard television broadcast signals, signals generated by video cassette recorders or computers. With suitable, state-of-the-art electronics, it will also permit the mixing and presentation of several video signals derived from different broadcast or other sources, and different portions of the screen could show different programs simultaneously if desired. Through a link to a microcomputer equipped with suitable software, the screen could also be used as a canvas for generating artwork be the users, or for the playing of electronic games. Another novel possibility is to display, in a stationary mode, reproductions of famous paintings (e.g., Mona Lisa or Primavera or Van Gogh's Irises), stored on "art video tapes", thus the sitting room could have a different "theme picture" each season or day of the week while it is not used as a receiver. Other innovative uses may well be found in the future.

Although the invention has been described in detail in the foregoing for purposes of illustration, it is to be understood that such details are solely for that purpose and that variations may be made therein by those skilled in the art without departing from the spirit and scope of the invention are described in the following claims.

What is claimed is:

1. A flat-screen color television display comprising:
   A. a plurality of modules positioned adjacent each other to form an array the size of the desired flat-screen display;
   B. each of said modules having a substrate with first and second major surfaces and edge surfaces, a matrix of picture elements extending over the first major surface of the substrate in a regular pattern with boundary picture elements adjacent the edge surfaces of the substrate to distances such that the regular pattern is continued substantially uninterrupted between adjacent modules, a matrix of electrical switching elements extending over the first major surface of the substrate with each of said switching elements capable of activating a picture element upon receiving electrical signals through both row and column conductive strips, said row and column conductive strips each extending over the first major surface from adjacent an edge surface to adjacent an opposite edge surface of the substrate such that said each switching element can be electrically activated by a row and a column conductive strip, a color filter positioned adjacent the picture elements of the matrix such that a color television image can be displayed by the modules, an electrical drive circuit positioned adjacent the second major surface of the substrate and capable of electrically activating the switching elements in correspondence to desired video images to be formed by the picture elements over the first major surface, and interconnecting conductors electrically connecting the drive circuit adjacent the second major surface with the row and column conductive strips on the first major surface and electrically insulated from similar interconnecting conductive strips of an adjacent module; and
   C. an electrical control circuit capable of categorizing incoming video signals corresponding to the modules in the array and directing the electrical signals to the drive circuit of each said module according to the portion of the video images to be reproduced by the picture elements on that module.

2. A flat-screen color television as described in claim 1 wherein the color filter is positioned one said each module between the picture elements and the first major surface of the substrate.

3. A flat-screen color television display as described in claim 1 wherein the picture elements and switching elements are positioned between the color filter and the first major surface of the substrate.

4. A flat-screen color television display as described in claim 1 wherein said each module can be removed from the array and replaced by another like module.

5. A flat-screen color television display as described in claim 1 wherein at least one set of row and one set of column conductive strips are provided side-by-side while retaining the corresponding distance between picture elements of the regular pattern.

6. A flat-screen color television display as described in claim 1 wherein the first major surface of the substrate of said each module is a mirror surface over which the picture elements, switching elements and conductive strips are positioned.

7. A flat-screen color television display as described in claim 1 wherein the interconnecting conductors connecting the drive circuit to the row and column conductive strips are positioned adjacent the edge surfaces of the substrate.

8. A flat-screen color television display as described in claim 1 wherein the desired video image is simultaneously and sequentially presented by the electrical control circuit to the electrical drive circuit of said each module.

9. A flat-screen color television display as described in claim 1 wherein that portion of the desired video image corresponding to one module is fed sequentially to the electrical drive circuit of that module from the electrical control circuit while at the same time all the modules are being driven in parallel.

10. A flat-screen color television display as described in claim 1 wherein the electrical control circuit comprises a decoder circuit and an image processor and wherein each said electrical drive circuit comprises a plurality of analog and digital switches for activating the switching elements in response to sequential signals from the image processor simultaneously fed to each said electrical drive circuit.

11. A flat-screen color television display as described in claim 10 wherein the image processor further comprises: an analog-to-digital converter, for transforming an analog video signal to a digital signal which can be easily stored; a memory for storing one frame of the video signal in digital form; a digital-to-analog converter for generating an analog video signal for said each module; and a timing and control circuit for simultaneously directing different portions of the analog video signal to each said module.

12. A flat-screen color television display as described in claim 11 wherein the number of said analog-to-digital converters corresponds to the number of colors in the display and there are two memories for each color.

13. A flat-screen color television display as described in claim 12 wherein there is one said digital-to-analog converter for each module.

14. A flat-screen color television display as described in claim 10 wherein analog switches activate the column conductors and digital switches activate the row conductors of the switching elements.

15. A flat-screen color television display as described in claim 14 wherein there are three times as many digital switches as analog switches.

16. A flat-screen color television display as described in claim 14 wherein there are three times as many analog switches as digital switches.

* * * * *